A. SALATA.
FILING MACHINE.
APPLICATION FILED MAR. 15, 1921.
1,411,936. Patented Apr. 4, 1922.
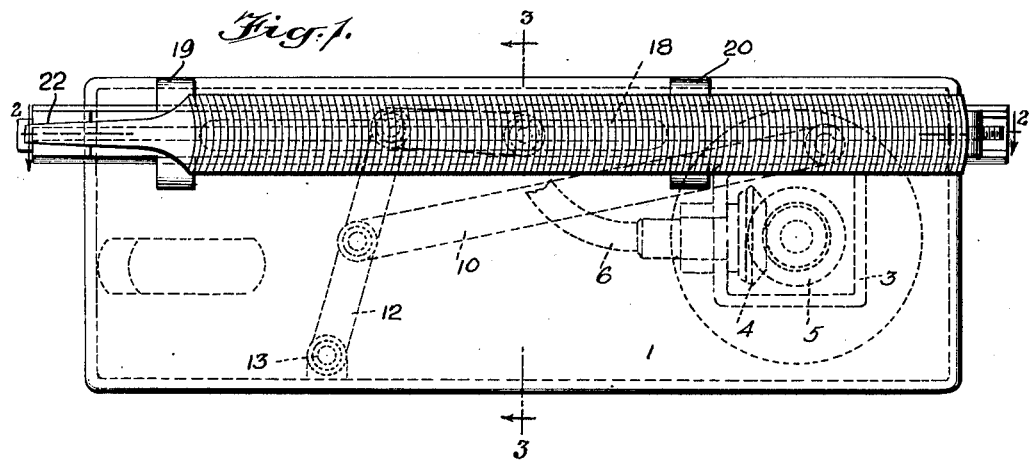
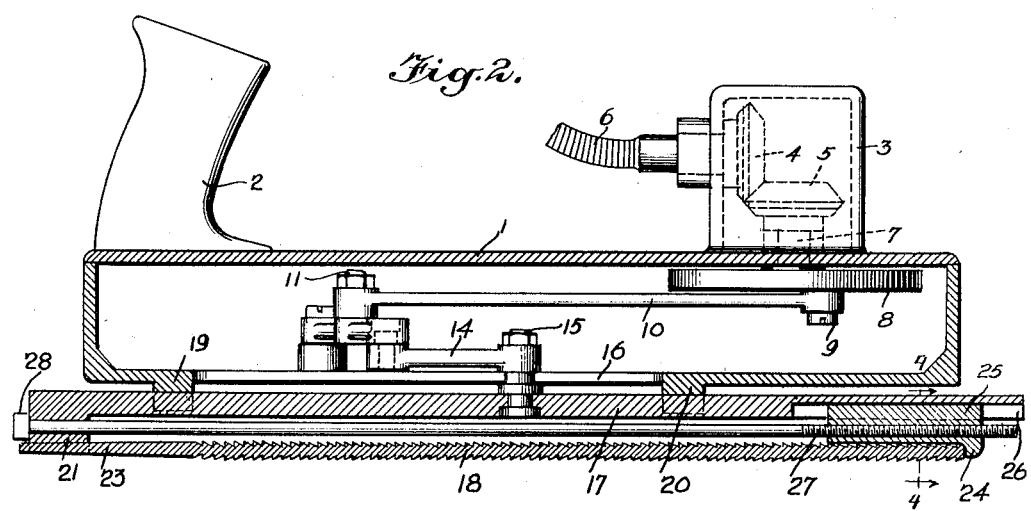
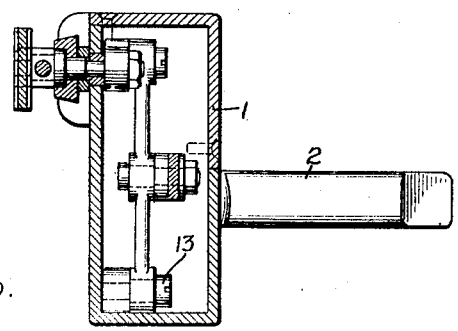
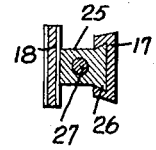
WITNESSES
INVENTOR
ANDREW SALATA
BY
ATTORNEYS

UNITED STATES PATENT OFFICE.

ANDREW SALATA, OF NEW YORK, N. Y.

FILING MACHINE.

1,411,936.  Specification of Letters Patent.  Patented Apr. 4, 1922.

Application filed March 15, 1921. Serial No. 452,418.

*To all whom it may concern:*

Be it known that I, ANDREW SALATA, a citizen of the United States, and a resident of the city of New York, borough of Manhattan, in the county and State of New York, have invented a new and Improved Filing Machine, of which the following is a full, clear, and exact description.

This invention relates to a filing machine, and has for an object the provision of a simple, compact, readily operable device for filing metallic and wooden surfaces.

Another object resides in the provision of means whereby this device can be very easily handled and applied.

A further object resides in the provision of means whereby tools of different character, such as files, saws, etc., can be readily attached to and detached from the machine.

A still further object resides in the particular construction and arrangement of parts which are hereinafter described and claimed and shown in the accompanying drawings.

The invention is illustrated in the drawings, of which—

Figure 1 is an inverted plan view of the device;

Figure 2 is a vertical longitudinal section;

Figure 3 is a vertical transverse section taken on the line 3—3 of Fig. 1; and

Figure 4 is a detail section taken on the line 4—4 of Fig. 2.

The preferred form of my invention, as shown in the drawings, comprises a casing or box 1 to the upper surface of which, at one end thereof, is attached a handle portion 2. To the same surface, at the other end thereof, there is attached in any suitable manner a housing 3. This housing contains bevel gears 4 and 5 adapted to mesh with each other. The bevel gear 4 is connected in any suitable manner to a flexible shaft, such as 6, which may lead to any suitable source of power. Instead of using a flexible shaft such as 6, an electric motor may be mounted on the top of the casing 1 adjacent the housing 3 and connected to the bevel gear 4, although this device is not shown. The bevel gear 5 is connected to a stub shaft 7 extending through the upper surface of the casing or box 1. This shaft 7 is connected to a rotatable disk 8. This disk 8 is provided with a crank pin 9 to which a crank arm 10 is suitably pivoted. The other end of the crank arm 10 is connected to a pin 11 disposed intermediate the length of a rocking lever 12. This rocking lever is pivoted on the pin 13 in one side of the box, the other end of the lever 12 being pivotally connected to a short link such as 14. The other end of the link 14 is connected to a stub shaft 15 extending through a slot 16 in the lower face of the casing 1. The lower end of this stub shaft 15 is connected in any suitable manner to a reciprocating carrier 17 adapted to hold a file such as 18. This carrier slides in grooved projections such as 19 and 20 extending from the lower face of the casing 1. One end of the carrier has a depending flange portion 21 on the lower face of which is a tapered groove such as 22 into which the tapered handle-end portion 23 of the file is inserted. The other end of the file bears against a projecting flange portion 24 on an adjustable member 25. This adjustable member 25 slides in a groove 26 in the carrier 17. The member 25 is bored to receive the threaded end of a shaft 27. This shaft extends through the depending flange 21 and is provided with a head 28. By moving the head 28 the shaft is rotated to adjust the movable member 25 to any length of file which it may be desirable to use.

In operation of this device, a suitable or desirable file is selected, the small tapered end of which is then inserted in the tapered groove 22, the other end being placed against the flange portion 24 of the adjustable member 25 which has been moved out to the proper length. The head 28 of the shaft 27 is then moved to force the flange 24 against the head of the file and hold it in position. The power connections are closed, either by an electrical switch or other means, and the bevel gears 4 and 5 rotated. This rotation causes the rotation of the disk 8 and the operation of the crank arm 10. This movement of the crank arm 10 causes the oscillation of the lever 12. This in turn causes the reciprocation of the carrier 17 in its guides and, consequently, the reciprocatory movement of the file 18. By having the handle 2 and the housing 3 disposed on the upper outside ends of the upper surface of the casing 1, this device can be firmly gripped in both hands and very readily moved around and applied with any desired pressure to the portion to be filed, whether it be one sort of surface or another.

What I claim is:

1. A filing machine, which comprises a casing or box, a handle at one end of the upper surface thereof, a housing at the opposite end of the upper surface thereof, a file carrier reciprocally mounted on the lower face of the casing, connections to the file carrier and disposed within the box, and power-transmitting devices located within the housing and operatively connected to said connections, said housing adapted to serve as an auxiliary handle portion.

2. A filing machine which comprises a casing or box, a handle at one end of the upper surface thereof, a housing at the opposite end of the upper surface thereof, a file carrier reciprocally mounted on the lower face of the casing, connections to the file carrier and disposed within the box, power-transmitting devices located within the housing and operatively connected to said connections, stationary file-engaging means on said carrier, adjustable file-engaging means on said carrier, and means for moving said adjustable member to engage one end of a file.

3. A filing machine, which comprises a box having a slot in its lower surface, a file carrier reciprocally mounted on the lower face of the box, a pin connected to the file carrier and extending into the box through said slot, a link pivotally connected to said pin, a rocking lever connected to said link, said rocking lever pivoted to the box, a crank arm pivoted to an intermediate point of the rocking lever, a disk, said arm connected to a point on said disk, a housing on the upper surface of the box, and power-transmitting means within said housing and connected to said disk to transmit power and cause a reciprocation of the file carrier.

4. A filing machine, which comprises a box having a slot in its lower surface, a file carrier reciprocally mounted on the lower face of the box, a pin connected to the file carrier and extending into the box through said slot, a link pivotally connected to said pin, a rocking lever connected to said link, said rocking lever pivoted to the box, a crank arm pivoted to an intermediate point of the rocking lever, a disk, said arm connected to a point on said disk, a housing on the upper surface of the box, power-transmitting means within said housing and connected to said disk to transmit power and cause a reciprocation of the file carrier, and a handle on the upper face of the box at the end opposite to the housing.

5. A filing machine which comprises a casing, a file carrier reciprocally mounted on the lower face of said casing, power-transmitting mechanism within the casing, and a connection between the mechanism and the file carrier.

ANDREW SALATA.